United States Patent [19]

Naito

[11] Patent Number: 4,686,261

[45] Date of Patent: Aug. 11, 1987

[54] PROCESS FOR PRODUCING POWDERY PAINT ADDITIVE COMPRISING REACTING A DIMER ACID POLYAMIDE, A HYDROXYL-SUBSTITUTED FLUORORESIN AND A POLYISOCYANATE

[76] Inventor: Minoru Naito, 77 Shimo-odanaka, Nakahara-ku, Kawasaki-shi, Japan

[21] Appl. No.: 863,255

[22] Filed: May 14, 1986

[30] Foreign Application Priority Data

May 14, 1985 [JP] Japan .................. 60-102394

[51] Int. Cl.$^4$ .......................................... C08L 175/00
[52] U.S. Cl. .................................... 525/131; 528/502
[58] Field of Search ................. 525/131, 934; 528/502

[56] References Cited

U.S. PATENT DOCUMENTS 3,917,741 11/1975 McGarr .............................. 525/131
4,536,557 8/1985 Heyman .............................. 525/131

Primary Examiner—Maurice J. Welsh
Attorney, Agent, or Firm—Wenderoth, Lind & Ponack

[57] ABSTRACT

A process for producing a powdery paint additive, comprising by reacting (a) a polymerized fatty acid polyamide resin formed by the reaction of a polymerized fatty acid with a polyamine and soluble in an organic solvent, (b) a fluororesin having a hydroxyl group in its molecular structure and soluble in an organic solvent and (c) a polyisocyanate which functions as a hardening agent for the resins (a) and (b) and which is soluble in an organic solvent to thereby form a hardened reaction product, the reaction being carried out in an organic solvent inert to an isocyanate group, and pulverizing the resulting reaction product.

The powdery paint additive thus obtained can be incorporated in various paints to improve the abrasion and weather resistances of a formed paint film and to form a solid decorative pattern on the paint film surface by a single painting operation.

3 Claims, 3 Drawing Figures

PROCESS FOR PRODUCING POWDERY PAINT ADDITIVE COMPRISING REACTING A DIMER ACID POLYAMIDE, A HYDROXYL-SUBSTITUTED FLUORORESIN AND A POLYISOCYANATE

FIELD OF THE INVENTION

The present invention relates to a process for producing a novel powdery paint additive. More particularly, the invention relates to a process for producing a powdery paint additive which can be incorporated in various paints to improve the abrasion and weather resistances of a formed paint film and to form a specific, solid decorative pattern on the paint film surface by a single painting operation.

BACKGROUND OF THE INVENTION

As for powdery paint additives capable of improving physical properties such as abrasion and weather resistances of various paints, hard pigments such as silica and alumina and powdery polyethylene have been used for improving the abrasion resistance of paints. However, these additives are impossible to improve also the weather resistance simultaneously. Further, though tetrafluoroethylene and trifluoroethylene resin paints have been known as paints which per se have excellent abrasion and weather resistances, they are both special paints and, particularly, the former necessitates a powder baking finish treatment.

Conventional processes for forming a solid reticular pattern on the paint film surface include one wherein the pattern is formed by a special painting technique with a special paint generally called pattern finish paint such as a wrinkle finish paint, crystalline paint, hammer tone enamel or leather tone enamel and one wherein a pattern is formed by a special technique such as printing or embossing. However, these processes have problems that special paints must be employed and that troublesome operation and special techniques are also required.

SUMMARY OF THE INVENTION

An object of the present invention is to provide a novel paint additive to be added to various paints and capable of improving abrasion and weather resistances of the paint film surface efficiently and easily without necessarily resorting to the baking treatment of the coating film surface.

Another object of the invention is to provide a novel powdery paint additive to be added to various paints and capable of forming a special, solid decorative pattern on the paint film surface easily by a single painting operation.

According to the present invention, the above-mentioned powdery paint additive can be prepared by reacting the following components (a), (b) and (c) in an organic solvent inert to an isocyanate group to form a hardened reaction product and then pulverizing the reaction product:

(a) a polymerized fatty acid polyamide resin obtained by the reaction of a polymerized fatty acid with a polyamine and soluble in an organic solvent, (b) a fluororesin having a hydroxyl group in its molecular structure and soluble in an organic solvent, and (c) a polyisocyanate which functions as a hardening agent for said resins (a) and (b) and which is soluble in an organic solvent.

The powdery paint additive obtained by the process of the present invention can be incorporated in various kinds of paints such as synthetic resin paints, oil paints, water paints, lacquers, powdery paints and the like. By adding the additive, the physical properties such as abrasion and weather resistances of the base paint can be improved remarkably and further chemical, water and stain resistances thereof are also improved.

Furthermore, the paint additive of the present invention has an interesting property that when it is added to a base paint in a relatively large amount, continuous or discontinuous, shallow cracks are formed on the surface of a paint film formed by a single painting operation and, consequently, a solid, reticular, decorative pattern which can be observed by the naked eye is formed spontaneously.

Additional objects and features of the present invention will become apparent from the detailed description of the invention described hereinbelow.

DETAILED DESCRIPTION OF THE INVENTION

Figure 1:
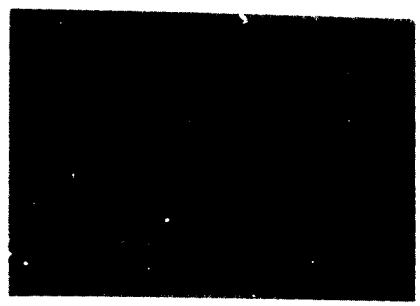
FIGS. 1, 2 and 3 are pictures showing solid, reticular patterns spontaneously formed on the surfaces of paint films obtained by a single coating operation with paints containing the paint additives produced by the process of the present invention.

The polymerized fatty acid polyamide resins (a) used in the present invention are obtained by reacting a polymerized fatty acid generally called dimer acid with a polyamine. The so-called dimer acid is usually prepared by thermal polymerization of an unsaturated fatty acid such as oleic, linolic or linolenic acid. The thus prepared dimer acid generally contains therein about 70 to 85 wt. % of dimer acid, about 10 wt. % or less of monomer acid and about 15 to 25 wt. % of trimer and higher polymerized fatty acid. The polyamine to be reacted with the dimer acid includes ehtylenediamine or its homologue such as diethylenetriamine, triethylenetetramine, tetraethylenepentamine or pentaethylenehexamine; an alkylenediamine such as propylenediamine, tetramethylenediamine or hexamethylenediamine; a diamine having an aromatic nucleus such as phenylenediamine or xylylenediamine; or isophoronediamine. The polymerized fatty acid polyamide resins (a) used in the present invention are soluble in an organic solvent, and preferably have amine value (indicated by milligrams of KOH equivalent to basic amines in 1 g of polyamide resin) of about 50 to 300. These polyamide resins are available commercially, for example, as trade names of "Tohmide #215-X", "Tohmide #210" (manufactured by Fuji Kasei Kogyo Co., Ltd.).

The fluororesins (b) are fluorine-containing copolymers having an active hydroxyl group in their molecular structure, an average molecular weight of 20,000 to 80,000, a fluorine content of 20 to 70 wt. %, preferably 30 to 60 wt. %, and soluble in an organic solvent such as xylene. Preferred examples of the fluororesins include copolymers of fluoroolefin, cyclohexyl vinyl ether, alkyl vinyl ether and hydroxyalkyl vinyl ether as disclosed in Japanese Patent Laid-Open Specification No. 57-34107, and hydroxyl group-containing copolymers obtained by hydrolyzing copolymers of tetrafluoroethylene or chlorotrifluoroethylene, vinylidene fluoride, vinyl esters and others as disclosed in Japanese Patent Laid-Open Specification No. 59-174657.

The polyisocyanates (c) have been known as hardening agents for the polymerized fatty acid polyamide resins (a) and the fluororesins (b), and those having an isocyanate group content of at least 5 wt. % are used usually. These polyisocyanates are selected suitably from the group consisting of monomers, dimers, trimers and adducts of aliphatic, cycloaliphatic and aromatic diisocyanates. Among them, non-yellowing diisocyanates such as hexamethylene diisocyanate and isophorone diisocyanate and adducts of them are particularly preferred.

The organic solvents inert to the isocyanate group used in the present invention are those in which all of the three starting materials, i.e. (a) polymerized fatty acid polyamide resin, (b) hydroxyl group-containing fluororesin and (c) polyisocyanate, are soluble and which are inert to the polyisocyanate. Examples of these solvents include aromatic hydrocarbons such as toluene, xylene and ethylbenzene; esters such as ethyl acetate and butyl acetate; and ketones such as methyl isobutyl ketone. Alcohols cannot be used as the solvent in the present invention, since they are generally reactive with the isocyanate group.

In practising the present invention, the components (a), (b) and (c) are reacted together in an organic solvent inert to the isocyanate group at ambient temperature. This reaction is exothermic and the reaction system is hardened in serveral minutes. The resulting hardened reaction product looks like a bulky bean-curd refuse having a slight elasticity and a slightly wet touch due to the organic solvent occluded therein. Surprisingly, however, this product can be divided finely to a particle diameter of about 1 to 100 μm by dry pulverization with a simple pulverization means such as a ball mill at ambient temperature without necessitating freeze pulverization technique or the like.

The easiness of the pulverization of the reaction product varies depending on the proportion of the starting materials used, the amine value and viscosity of the polymerized fatty acid polyamide resin, the fluorine content of the hydroxyl group-containing fluororesin, the isocyanate group content of the polyisocyanate and the kind of the solvent. From the viewpoints of the pulverization of the reaction product and the effects of the paint additive, the following proportion is preferred: 40 to 70 wt. % of the polymerized fatty acid polyamide resin (a), 5 to 30 wt. % of the hydroxyl group-containing fluororesin (b) and 15 to 50 wt. % of the polyisocyanate (c).

Preferred organic solvents include aromatic hydrocarbons. Among them, xylenes (o-, m- and p-xylenes and mixtures thereof) are particularly excellent solvents. When these solvents are used, the reaction product can be pulverized at ambient temperature more smoothly than that effected in other solvents.

Though the mechanism of the phenomenon by which the hardened reaction product even having a slight elasticity can be pulverized finely has not fully been elucidated yet, it may be supposed that the polymerized fatty acid polyamide resin used as one of the starting materials contributes greatly to this mechanism.

The reaction product can be pulverized by means of a disintegrator, jet mill, cutter mill, etc. in addition to the above-mentioned ball mill.

The powder of the reaction product thus obtained is insoluble in water, organic solvents, acids and alkalis. The powdery paint additive is colored usualy with a colorant before the use. The colorants are those usually employed in the production of paints, such as organic pigments, inorganic pigments, color lakes and dyes. The colorant is selected suitably from them. The coloring is effected usually by adding the colorant in the reaction system in the course of the preparation of the intended additive.

The powdery paint additive thus obtained by the process of the present invention can be incorporated extensively in synthetic resin paints such as acrylic, urethane and alkyd resin paints, oil paints, water paints, lacquers and powdery paints. By adding this additive, the physical properties such as abrasion and weather resistances of the base paint can be improved remarkably and further chemical, water and stain resistances thereof are also improved.

The amount of the additive which may be selected suitably depending on the kind and purpose of the base paint is usually 3 to 40 parts by weight for 100 parts by weight of the base paint.

Figure 2:
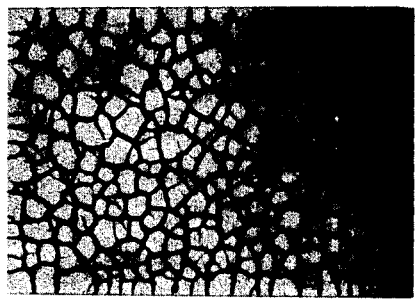
Figure 3:
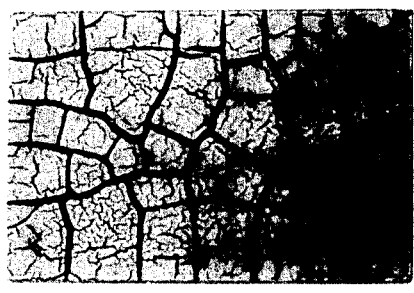

The paint additive obtained by the present invention has an interesting property that when it is added to a base paint in a relatively large amount such as 15 parts by weight or more for 100 parts by weight of the base paint, continuous or discontinuous, shallow cracks are formed on the surface of a paint film formed by a single painting operation as shown in pictures of attached FIGS. 1 to 3 and, consequently, a solid, reticular, decorative pattern which can be observed by the naked eye is formed spontaneously. The kind of the pattern is dependent on the amount and particle diameter of the additive. By controlling them, various patterns of, for example, turtle shell, fish scales or hide can be realized. Generally, a large pattern like turtle shell (see FIG. 3) is formed when the additive is used in a large amount, while a small pattern like fish scales (see FIG. 2) or hide (see FIG. 1) is formed when it is used in a smaller amount. Furhter, the particle diameter of the powdery additive exerts an influence on the unevenness of the solid pattern formed on the surface of the paint film.

Though the mechanism of the spontaneous formation of the solid decorative pattern on the paint film surface has not fully been elucidated yet, it is supposedly due to a shrinkage reaction on the paint film surface caused by the cohesion of the fluororesin used as one of the starting materials for the paint additive.

The following Examples will further illustrate the present invention, in which percentages and parts are given by weight.

EXAMPLE 1

50 parts of a solution (non-volatile content: 75%) of hexamethylene diisocyanate trimer in xylene was added in several times under stirring in an open system at room temperature to a pale yellow, transparent solution obtained by mixing 100 parts of a solution (non-volatile content: 70%) of a polymerized fatty acid polyamide resin produced by condensation of a dimer acid with polyethylenepolyamine and available as "Tohmide #215-X" (manufactured by Fuji Kasei Kogyo Co., Ltd. Appearance: brown liquid. Specific gravity: 0.98. Amine value: 220±15. Viscosity (40° C.): 50,000–70,000 cP) in xylene, 20 parts of a solution (non-volatile content: 50%) of a hydroxyl group-containing fluororesin available as "Lumiflon LF100" (a trade name of a product manufactured by Asahi Glass Co., Ltd. Specific gravity: 1.4. OH value (mg KOH/g): 52. Viscosity (25° C.): 140 cP (30% in xylene/MIBK)) in xylene and 10 parts of xylene. An exothermic reaction occurred immediately to harden the reaction mixture and the temperature at this time was about 60° C. The time required for the reaction was several minutes. The resulting hardened reaction product had a pale yellowish brown, bulky bean-curd refuse-like appearance and a slight elasticity. This product was pulverized in a porcelain ball mill for about 30 hours and then sieved to obtain 130 parts of a white powder having a particle diameter of 10 to 100 μm. This powdery prodcut was insoluble in water, organic solvents, acids and alkalis and carbonized to form a black product at 300° to 400° C. without showing any melting point.

EXAMPLE 2

148 parts of a black powder having a particle diameter of 15 to 100 μm was obtained from the same starting materials and in the same manner as in Example 1 except that 20 parts of carbon black was added to the reaction system.

A paint film was formed from a mixture of 100 parts of an acrylic resin paint of banking type and 7 or 10 parts of the powder obtained as above under the following painting conditions. The abrasion and weather resistances of the paint film were examined and the results were compared with those obtained without using any additives. The results are shown in the following table.
Painting conditions:
 painting process: spraying by hand
 drying conditions: 150° C., 20 min.
 paint film thickness: 30±2 μm

|  | Amount of additive | | |
| --- | --- | --- | --- |
|  | 7 parts | 10 parts | none |
| Abrasion resistance test* | | | |
| Taber method (CS-10, 500 gf) | — | 10,000 times | 2,500 times |
| Eraser method (1.64 kgf) | — | 1,000 times | 180 times |
| Accelerated weathering resistance test Color difference after treatment with Sunshine Weather-O-meter for 400 hrs. | 1.07 NBS | 1.02 NBS | 2.14 NBS |

(Note)
*judged by base exposure judgement method.

It is apparent from the above-described test results that the abrasion and weather resistnaces are improved remarkably by using the additive produced by the process of the present invention. No reticular, solid pattern was formed on the surface of the paint film obtained in this exmaple.

EXAMPLE 3

20, 25 or 30 parts of the powdery paint additive obtained in Example 2 was added to 100 parts of an acrylic resin lacquer (non-volatile content: 30%). A paint film was formed from this paint mixture by a single coating operation. Pictures of patterns produced on the surface of the paint films thus formed are given in FIG. 1 (20 parts of the additive), FIG. 2 (25 parts) and FIG. 3 (30 parts).

It is apparent from these pictures that the solid patterns are optionally changeable from a small fish scale pattern or a network pattern like that of hide to a large turtle shell pattern, by altering the amount of the paint additive.

EXAMPLE 4

128 parts of a white powder having a particle diameter of 10 to 100 μm was obtained from the same starting materials and in the same manner as in Example 1 except that a solution of 30 parts of isophorone diisocyanate in 10 parts of xylene was used instead of 50 parts of the solution of hexamethylene diisocyanate trimer in xylene.

This powdery product was insoluble in water, organic solvents, acids and alkalis and carbonized to form a black product at 300° to 400° C. without showing any melting point.

When the powder is used as a paint additive, the abrasion and weather resistances of the paint film are improved in the same manner as in Example 2, and a solid, network pattern is formed on the surface of the paint film in the same manner as in Example 3.

EXAMPLE 5

10 parts of xylene was added to 70 parts of a polymerized fatty acid polyamide resin produced by condensation of a dimer acid with polyethylenepolyamine and available as "Tohmide #210" (manufactured by Fuji Kasei Kogyo Co., Ltd. Appearance: semisolid. Amine value: 100±5. Softening point: 45° C. Viscosity (200° C.): 200–600 cP. Specific gravity: 0.98), and the mixture was heated to about 60° C. to dissolve the polyamide resin. Into the thus formed solution were added 20 parts of a solution (non-volatile content: 50%) of a hydroxyl group-containing fluororesin available as "Lumiflon LF100" in xylene and 30 parts of a solution (non-volatile content: 75%) of hexamethylene diisocyamate trimer in xylene.

The subsequent operations were carried out in the same manner as in Example 1 to obtain 110 parts of a white powder having a particle diameter of 15 to 100 μm.

EXAMPLE 6

132 parts of a white powder having a particle diameter of 15 to 100 μm was obtained from the same starting materials and in the same manner as in Example 1 except that a hydroxyl group-containing fluororesin available as "Lumiflon LF200" (a trade name of Asahi Glass Co., Ltd. Specific gravity: 1.4. OH value (mg KOH/g): 52. Viscosity (25° C.): 20 cP (30% in xylene/MIBK)) instead of "Lumiflon LF100".

It will be understood from the foregoing description that a powdery paint additive capable of improving physical properties such as abrasion and weather resistances of paints can be provided according to the present invention. Particularly in the pulverization step of the process of the invention, fine pulverization is possible by a simple dry pulverization means at ambient temperature without necessitating freeze-pulverization technique or the like.

Further, the paint additive obtained by the present invention can be used easily by incorporating the same in a base paint and forming a paint film to improve the physical properties of the paint film surface and no baking treatment of the paint film surface is necessarily required.

When the paint additive obtained by the present invention is incorporated in a base paint in a relatively large amount, the obtained paint mixture is capable of forming a solid, reticular decorative pattern spontaneously on the paint film surface by a single painting operation. This is a specific effect which could not be attained with ordinary paint additives.

While the ivnention has been described in its preferred embodiments, it will be obvious to those skilled in the art that various modifications may be made without departing from the scope of the appended claims.

What is claimed is:

1. A process for producing a powdery paint additive comprising reacting (a) a polymerized fatty acid polyamide resin formed by the reaction of a polymerized fatty acid with a polyamine and soluble in an organic solvent, (b) a fluorine-containing copolymer having an active hydroxyl group in its molecular structure, an average molecular weight of 20,000 to 80,000, a fluorine content of 20 to 70 wt. %, and soluble in an organic solvent, and (c) a polyisocyanate which functions as a hardening agent for said resins (a) and (b) and which is soluble in an organic solvent, to thereby form a hardened reaction product, said reaction being carried out in an organic solvent inert to an isocyanate group, and pulverizing the resulting reaction product.

2. A process for producing a powdery paint additive according to claim 1, wherein 40 to 70 wt. % of the polymerized fatty acid polyamide resin (a), 5 to 30 wt. % of the fluororesin (b) and 15 to 50 wt. % of the polyisocyanate (c) are reacted together.

3. A process for producing a powdery paint additive according to claim 1, wherein xylene is used as the organic solvent inert to an isocyanate group.

* * * * *